Patented Sept. 16, 1941

2,256,157

UNITED STATES PATENT OFFICE 2,256,157

VULCANIZATION OF RUBBER

George W. Watt, Austin, Tex., assignor to Wingfoot Corporation, Wilmington, Del., a corporation of Delaware No Drawing. Application January 11, 1939,
Serial No. 250,335

4 Claims. (Cl. 260—784)

This invention relates to the vulcanization of rubber. More particularly, it relates to the vulcanization of rubber in the presence of a new class of accelerators. The invention includes the method of treating rubber, the rubber products obtained and the accelerator compounds themselves.

Many materials have been discovered which may be utilized for the acceleration of the vulcanization of rubber. According to the present invention, a new class of chemical compounds useful as accelerators and possessing certain novel characteristics has been found. These materials conform to the general formula

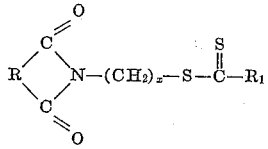

in which R is an arylene group such as phenylene or naphthylene and $R_1$ is an aryl, alkyl, aralkyl or furyl radical and $x$ is a small whole number between 1 and 3. Both R and $R_1$ may contain substituent groups such as alkyl, aryl, aralkyl, amino, alkoxy, aryloxy, hydroxyl, nitro and halogen groups.

One method of preparing the compounds of the invention is illustrated by the following example.

Example

Seventeen and one-half parts of chlor methyl phthalimide were dispersed in 100 parts of alcohol. A solution of 14.4 parts of ammonium dithiofuroate in 100 parts of 50% alcohol was then added, the characteristic red color of the dithiofuroate was discharged and an orange-red solid separated. The reaction mixture was warmed for ½ hour at 60° C. and was then cooled in an ice bath. The solid product was filtered off and washed with cold alcohol. Thus purified, it melted at 149-153° C. The yield of 25½ parts was 94% of the theoretical. The following equation may be taken to represent the mechanism of the reaction:

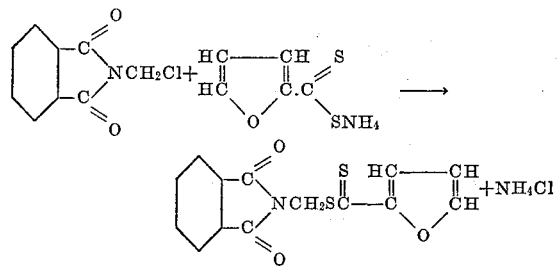

Other materials of the invention may be prepared by similar methods by proper selection of starting materials. Thus, any other N-haloalkylene phthalimides may be employed in place of the chlor methyl phthalimide of the example, such as N-(α-chlorethyl) phthalimide and N-(β-chlorethyl) phthalimide. In a similar manner, other suitable dithio acids, preferably in the form of reactive salts, such as the ammonium or alkali metal salts, may be employed in place of the ammonium dithiofuroate of the example. Representative examples of such dithio acids are dithiobenzoic acid, dithionaphthoic acid, dithioacetic acid, dithiolauric acid, dithiooleic acid, dithioacrylic acid, dithiocrotonic acid, ortho amino dithiobenzoic acid, dithiosalicyclic acid, dithiopropionic acid, and trithiosalicyclic acid.

In order to test the efficacy of the product of the example, it was compounded with rubber in accordance with the following formula:

|  | Parts |
|---|---|
| Smoked sheet | 100.00 |
| Zinc oxide | 5.00 |
| Sulfur | 3.00 |
| Accelerator | 0.50 |

Rubber so compounded was vulcanized and tested to yield the following results:

| Cure mins., °F. | Tensile | Elongation | Modulus | |
|---|---|---|---|---|
| | | | 500% | 700% |
| 20/260 | 98 | 840 | 14 | 43 |
| 30 | 159 | 775 | 29 | 101 |
| 40 | 138 | 775 | 25 | 87 |
| 60 | 137 | 790 | 24 | 75 |
| 80 | 122 | 800 | 21 | 67 |

It will be seen from these data that the compounds of the invention are excellent accelerators yielding good cures at operable temperatures in a reasonable time.

The materials of the invention may also be used in conjunction with basic accelerators such as diphenylguanidine, diortho tolyl guanidine, 2-4-diamino diphenyl amine, p-p' diamino diphenyl methane, diphenylguanidine neutral phthalate, butyl ammonium oleate, and the like. The product of the example was compounded with rubber together with diphenylguanidine according to the following formula:

|  | Parts |
|---|---|
| Smoked sheet | 100.00 |
| Zinc oxide | 5.00 |
| Sulfur | 3.00 |
| Diphenylguanidine | 0.20 |
| Accelerator | 0.50 |

Sample of rubber so compounded were vulcanized and tested to yield the following results:

| Cure mins., °F. | Tensile | Elongation | Modulus | |
|---|---|---|---|---|
| | | | 500% | 700% |
| 40/260 | 78 | 850 | 12 | 35 |
| 60 | 91 | 795 | 17 | 52 |
| 80 | 98 | 770 | 19 | 65 |
| 120 | 108 | 790 | 19 | 61 |

It will be observed from these data and the data showing the results of the use of the product of the example without diphenylguanidine that, contrary to the usual rule, the cure obtained with the basic activator is slower than that obtained without the use of the auxiliary accelerator. This result is almost unique in view of the generally encountered results obtained using basic activating accelerators with acidic accelerators or their derivatives.

It is intended that the patent shall cover, by suitable expression in the appended claims, all features of patentable novelty inherent in the invention.

What I claim is:

1. The process of treating rubber which comprises vulcanizing it in the presence of a compound having the formula

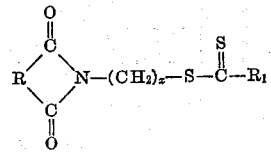

in which R is arylene and $R_1$ is furyl and $x$ is a whole number from one to three inclusive.

2. A rubber product which has been vulcanized in the presence of a compound having the formula

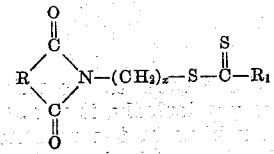

in which R is arylene and $R_1$ is furyl and $x$ is a whole number from one to three inclusive.

3. The process of treating rubber which comprises vulcanizing it in the presence of phthalimido-methylene-dithiofuroate.

4. A rubber product which has been vulcanized in the presence of phthalimido-methylene-dithiofuroate.

GEORGE W. WATT.